(12) United States Patent
Suzuki et al.

(10) Patent No.: US 11,182,633 B2
(45) Date of Patent: Nov. 23, 2021

(54) STORAGE MEDIUM HAVING STORED LEARNING PROGRAM, LEARNING METHOD, AND LEARNING APPARATUS

(71) Applicant: FUJITSU LIMITED, Kawasaki (JP)

(72) Inventors: Kanata Suzuki, Kawasaki (JP); Yasuto Yokota, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 120 days.

(21) Appl. No.: 16/676,397

(22) Filed: Nov. 6, 2019

(65) Prior Publication Data

US 2020/0151488 A1    May 14, 2020

(30) Foreign Application Priority Data

Nov. 12, 2018 (JP) .............................. JP2018-212578

(51) Int. Cl.
*G06K 9/62* (2006.01)
*G06K 9/32* (2006.01)
*B25J 9/16* (2006.01)

(52) U.S. Cl.
CPC ......... *G06K 9/3241* (2013.01); *G06K 9/6257* (2013.01); *G06K 9/6259* (2013.01); *B25J 9/1697* (2013.01)

(58) Field of Classification Search
None
See application file for complete search history.

(56) References Cited

U.S. PATENT DOCUMENTS

| 7,318,051 | B2* | 1/2008 | Weston | G06K 9/6262 |
| | | | | 706/12 |
| 10,864,630 | B2* | 12/2020 | Abe | B25J 9/1612 |
| 10,902,629 | B2* | 1/2021 | Nagatsuka | G06K 9/6256 |
| 2018/0364731 | A1* | 12/2018 | Liu | G06T 7/74 |
| 2019/0005374 | A1* | 1/2019 | Shankar | B25J 9/1671 |
| 2019/0134821 | A1* | 5/2019 | Patrick | B25J 5/007 |
| 2019/0152054 | A1* | 5/2019 | Ishikawa | B25J 9/163 |
| 2019/0248003 | A1* | 8/2019 | Nagarajan | B25J 9/1612 |
| 2019/0308325 | A1* | 10/2019 | Higo | B25J 15/0616 |

(Continued)

OTHER PUBLICATIONS

Ren et al., "Faster R-CNN: towards real-time object detection with region proposal networks." IEEE transactions on pattern analysis and machine intelligence 39, No. 6 (2016): 1137-1149. (Year: 2016).*

(Continued)

*Primary Examiner* — Feng Niu
(74) *Attorney, Agent, or Firm* — Fujitsu Patent Center

(57) ABSTRACT

A learning method is performed by a computer. The method includes: inputting a first image to a model, which outputs, from an input image, candidates for a specific region and confidences indicating probabilities of the respective candidates being the specific region, to cause the model to output a plurality of candidates for the specific region and confidences for the respective candidates; calculating a first value for each of candidates whose confidences do not satisfy a certain criterion among the candidates output by the model, the first value increasing as the confidence increases; calculating a second value obtained by weighting the first value such that the second value decreases as the confidence increases; and updating the model such that the second value decreases.

13 Claims, 11 Drawing Sheets

(56) References Cited

U.S. PATENT DOCUMENTS

2019/0329409 A1* 10/2019 Yamada .................. B25J 9/1664
2021/0089841 A1* 3/2021 Mithun ................ G06K 9/4604

OTHER PUBLICATIONS

Nagao et al., "Development of a teachingless robot system for welding a large-sized box-type construction." Advanced Robotics 15, No. 3 (2001): 287-291. (Year: 2001).*

Yaskawa Electric Corporation, "Development of AI Picking Function Realizing Various Ways of Gripping of Target Objects by Robot", [Online], Nov. 21, 2017, Searched on Oct. 29, 2018. Internet <URL:https://www.yaskawa.co.jp/newsrelease/technology/35697> With Translation of the relevant part.

Wei Liu et al., "SSD: Single Shot MultiBox Detector", European Conference on Computer Vision (ECCV), Oct. 8-16, 2016, 17 pages, Searched on Oct. 29, 2018. Internet <URL:http://www.cs.unc.edu/~wliu/papers/ssd.pdf>.

* cited by examiner

| CANDIDATE | CONFIDENCE | CLASS | UNCORRECTED ERROR | NEGATIVE EXAMPLE RANK | CORRECTED ERROR |
|---|---|---|---|---|---|
| 311a′ | 0.9 | GRIPPING POSITION | 0.1 | - | 0.1 |
| 311b′ | 0.8 | BACKGROUND | 0.8 | 1 | 0.08 |
| 311c′ | 0.7 | BACKGROUND | 0.7 | 2 | 0.105 |
| 311d′ | 0.7 | BACKGROUND | 0.7 | 3 | 0.105 |
| 311e′ | 0.6 | BACKGROUND | 0.6 | 4 | 0.12 |
| 311f′ | 0.5 | BACKGROUND | 0.5 | 5 | 0.125 |
| 311g′ | 0.4 | BACKGROUND | 0.4 | 6 | 0.4 |
| 311h′ | 0.2 | BACKGROUND | 0.2 | 7 | 0.2 |
| ... | | | | | |

STORAGE MEDIUM HAVING STORED LEARNING PROGRAM, LEARNING METHOD, AND LEARNING APPARATUS

CROSS-REFERENCE TO RELATED APPLICATION

This application is based upon and claims the benefit of priority of the prior Japanese Patent Application No. 2018-212578, filed on Nov. 12, 2018, the entire contents of which are incorporated herein by reference.

FIELD

The embodiment discussed herein is related to a non-transitory computer-readable storage medium having stored a learning program, a learning method, and a learning apparatus.

BACKGROUND

In the related art, there is known a technique for detecting, by image recognition, a gripping position at which a picking robot grips a part. For example, the Single Shot MultiBox Detector (SSD) is known as a method for detecting an object by image recognition.

The SSD uses a convolutional neural network as a model. The model of the SSD outputs, for each bounding box in an input image, a degree indicating how high the probability that the detection target exists. A bounding box is a default rectangular region in the input image.

Learning that no longer requires teaching (hereinafter, referred to as teachingless learning) is also known. In teachingless learning, a computer autonomously performs a series of procedures of actually performing a trial to determine whether a result output by a model used in image recognition is correct and of further training the model by obtaining a result of the trial as feedback.

The related art is described in Yaskawa Electric Corporation, "Development of AI Picking Function Realizing Various Ways of Gripping of Target Objects by Robot (Robotto ni yoru Taishoubutsu no Tayouna Tsukamikata wo Jitsugen-suru AI Pikkingu Kinou wo Kaihatsu)", [Online], [Retrieved on Oct. 29, 2018], Internet <URL: https://www.yaskawa.co.jp/newsrelease/technology/35697>.

The related art is also described in Wei Uu, Dragomir Anguelov, Dumitru Erhan, Christian Szegedy, Scott Reed, Cheng-Yang Fu, Alexander C. Berg, "SSD: Single Shot MultiBox Detector", [Online], [Retrieved on Oct. 29, 2018], Internet <URL: http://www.cs.unc.edu/~wliu/papers/ssd.pdf>.

However, recognition accuracy of the model that is trained through teachingless learning according to technique described above may decrease in some cases, which is problematic.

SUMMARY

According to an aspect of the embodiments, a learning method is performed by a computer. The method includes: inputting a first image to a model, which outputs, from an input image, candidates for a specific region and confidences indicating probabilities of the respective candidates being the specific region, to cause the model to output a plurality of candidates for the specific region and confidences for the respective candidates; calculating a first value for each of candidates whose confidences do not satisfy a certain criterion among the candidates output by the model, the first value increasing as the confidence increases; calculating a second value obtained by weighting the first value such that the second value decreases as the confidence increases; and updating the model such that the second value decreases.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

A description is now given of an example of how teachingless leaning is performed for a model for use in detection of a gripping position for a picking robot. In this case, first, an image of a tray on which a plurality of objects are actually placed is input to a model, and one gripping position is detected. The picking robot actually tries to grip the object at the detected gripping position. Information as to whether gripping by the picking robot is successful is fed back to the model. In this way, learning is performed.

The trial for gripping the object performed by the picking robot consequently changes the positions or the like of the objects on the tray. For this reason, the trial is performed only once for one input image. For example, when there are a plurality of candidates for the gripping position, only one candidate is treated to be true and the other candidates are treated to be false in learning.

Figure 4:
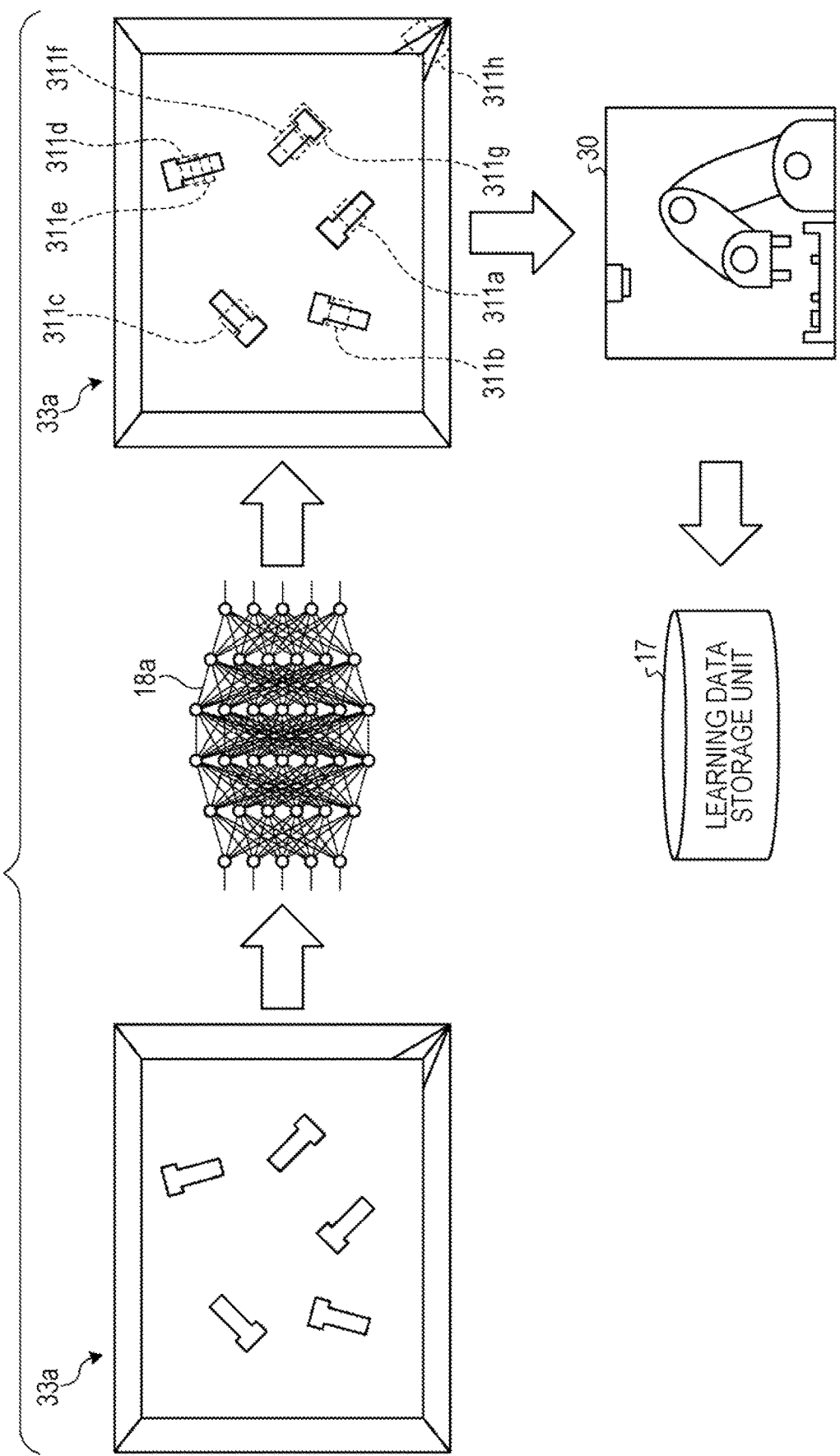
FIG. 4 is a diagram for describing a flow of a generation process.

For example, in an example illustrated in FIG. 4, it is assumed that the model outputs regions surrounded by broken lines as candidates for the gripping position of T-shaped objects on a tray and outputs confidences indicating probabilities of the individual regions being the gripping position. It is further assumed that since the confidence for a candidate 311a is the highest, a gripping trial is performed for the candidate 311a and is successful.

In this case, candidates 311b, 311c, and so on are similar to the candidate 311a. Thus, the confidences for the candidates 311b and 311c are considered to be high to some extent. In contrast, a candidate 311h is apparently not the gripping position. Thus, the confidence for the candidate 311h is considered to be lower than those for the candidates 311b, 311c, and so on. However, in teachingless learning, all the regions other than the candidate 311a are uniformly treated to be false as a result of the trial.

For example, even if the candidates 311b and 311c are actually adoptable as the gripping position, the trained model outputs the confidences for the candidates 311b and 311c to be low.

In one aspect, it is an object to increase recognition accuracy of a model that is trained through teachingless learning.

An embodiment of a learning program, a learning method, and a learning apparatus and a detection program, a detection method, and a detection apparatus using the same will be described in detail below with reference to the accompanying drawings. Note that this embodiment does not limit the present disclosure. The embodiment may be appropriately combined with another embodiment within a scope without contradiction.

[Embodiment]
[Functional Configuration]

Figure 1:
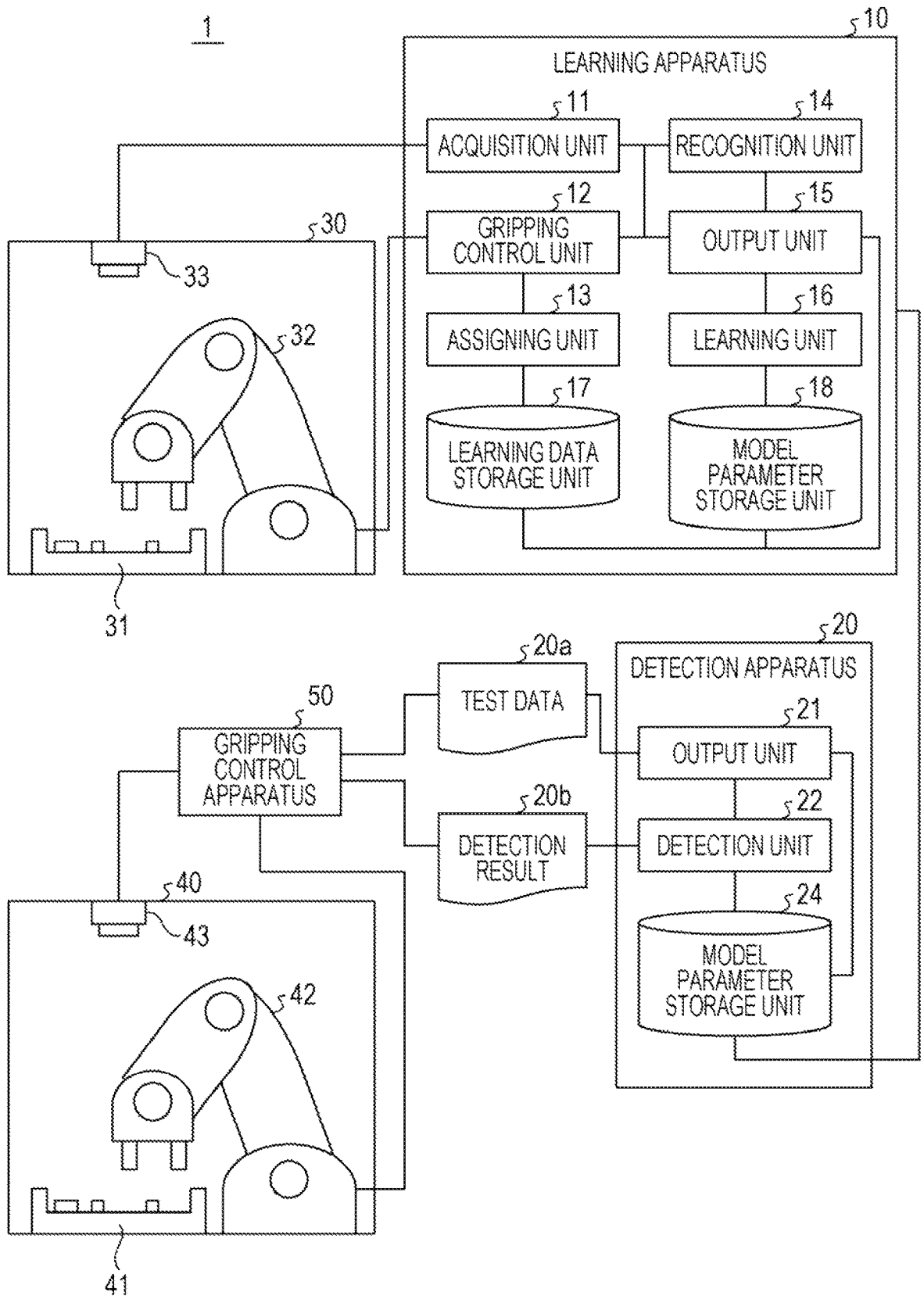
FIG. 1 is a functional block diagram Illustrating a functional configuration of a system including a learning apparatus and a detection apparatus according to an embodiment.

Functional configurations of a learning apparatus and a detection apparatus will be described with reference to FIG. 1. FIG. 1 is a functional block diagram illustrating a functional configuration of a system including the learning apparatus and the detection apparatus according to an embodiment. A system 1 is a system for performing training of a model used in a picking robot, detection of a gripping position using the model, control of gripping actually performed by the picking robot, and so on. As illustrated in FIG. 1, the system 1 includes a learning apparatus 10, a detection apparatus 20, a gripping system 30, a gripping system 40, and a gripping control apparatus 50.

The learning apparatus 10 trains a model by using the gripping system 30. The detection apparatus 20 detects, by using the model trained by the learning apparatus 10, a gripping position based on test data 20a acquired from the gripping system 40, and outputs a result of the detection as a detection result 20b. The gripping control apparatus 50 controls the gripping system 40 based on the detection result 20b output from the detection apparatus 20.

For example, the gripping system 30 may be constructed in an environment for development and testing. The gripping system 40 may be actually operated in a factory or the like. The gripping systems 30 and 40 may be the same.

[Configuration of Learning Apparatus]

As illustrated in FIG. 1, the learning apparatus 10 is coupled to the gripping system 30. The gripping system 30 includes a tray 31, a robot 32, and a camera 33. Objects to be gripped are placed on the tray 31. The robot 32 is a picking robot having a two-finger hand. The robot 32 grips any of the objects placed on the tray 31. At that time, the robot 32 grips the object at a gripping position instructed by the learning apparatus 10. The camera 33 captures an image of the tray 31 from the above and transmits the captured image to the learning apparatus 10.

As illustrated in FIG. 1, the learning apparatus 10 includes an acquisition unit 11, a gripping control unit 12, an assigning unit 13, a recognition unit 14, an output unit 15, a learning unit 16, a learning data storage unit 17, and a model parameter storage unit 18.

The acquisition unit 11 acquires an image of objects placed on the tray 31 from the camera 33. The gripping control unit 12 controls the robot 32 to grip an object in accordance with a gripping position input thereto. The assigning unit 13 assigns a label to the image acquired by the acquisition unit 11.

The label is information indicating a gripping position and whether gripping of an object is successful when the robot 32 tries to grip the object at the gripping position. Whether gripping is successful is determined by using the camera 33, another camera (not illustrated), a certain sensor, or the like. In the following description, it is assumed that learning data is constituted by a combination of an image and a label. For example, the assigning unit 13 assigns 1 as a confidence to a region for which gripping is successful. The assigning unit 13 assigns 0 as a confidence to the other regions.

A model outputs, from an input image, candidates for a specific region and confidences indicating probabilities of the respective candidates being the specific region. In this embodiment, the model outputs confidences for a plurality of classes including the specific region. The specific region is a gripping position of an object.

For example, there are two types of classes, which are a gripping position class and a background class. In the case where there are a plurality of types of objects, the classes may be set to be a gripping position class of a first object, a gripping position class of a second object, and a background class. The confidence may be a probability of a rectangle being a certain class. For example, when the probability of a certain region being a gripping position is equal to 0.9, the confidence that the region is in the gripping position class is equal to 0.9.

It is assumed that the model according to the embodiment is implemented by causing a model of the SSD to further output an angle indicating a rotation angle of a bounding box. The model of the SSD outputs, from an input image, any of bounding boxes that are rectangles set in advance and a confidence for each class.

The recognition unit 14 performs image recognition for generation of learning data, pre-learning for the model, and so on. The recognition unit 14 is capable of extracting a region where an object possibly exists by determining a difference between an image of a state in which there is no object and an image of a state in which objects are placed. The recognition unit 14 is capable of weighting a palette corresponding to the coordinates on the tray according to a presence probability of the object.

The output unit 15 inputs a first image to the model, which outputs, from an input image, candidates for the specific region and confidences indicating probabilities of the respective candidates being the specific region, to cause the model to output a plurality of candidates for the specific region and confidences for the respective candidates. For example, the first image is an image acquired by the acquisition unit 11 from the camera 33.

Figure 2:
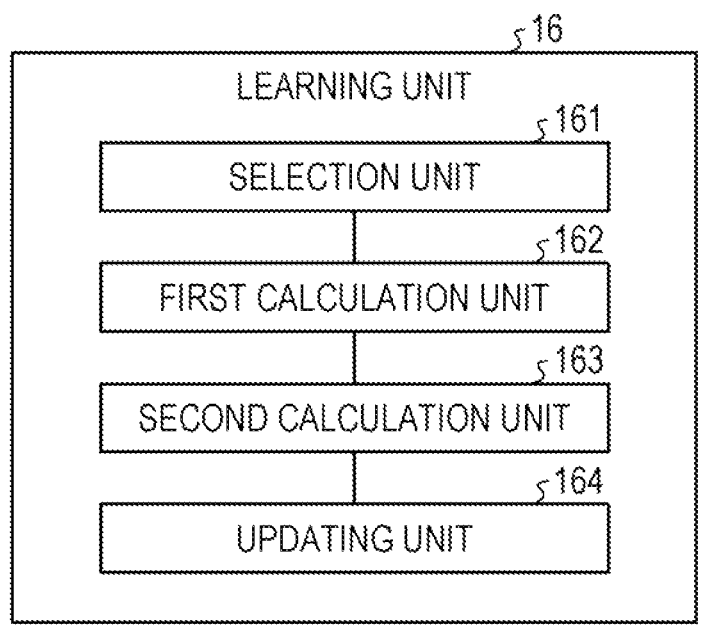
FIG. 2 is a functional block diagram illustrating a functional configuration of a learning unit.

The learning unit 16 performs learning by using the learning data to update the model. FIG. 2 is a functional block diagram illustrating a functional configuration of the learning unit 16. As illustrated in FIG. 2, the learning unit 16 includes a selection unit 161, a first calculation unit 162, a second calculation unit 163, and an updating unit 164.

The selection unit 161 selects a candidate whose confidence satisfies a certain criterion as a selected region from among the candidates output by the model. For example, the selection unit 161 selects a candidate with the highest confidence from among the candidates output by the model. The candidate region selected by the selection unit 161 is classified into the gripping position class. In the following description, the candidate selected by the selection unit 161 may be referred to as a positive example.

The first calculation unit 162 calculates a first value for each of the candidates whose confidences do not satisfy the certain criterion among the candidates output by the model. The first value increases as the confidence increases. The candidates whose confidences do not satisfy the certain criterion are candidates that are not selected by the selection unit 161, that is, candidates that are classified into the background class. In the following description, the candidates that are not selected by the selection unit 161 may be referred to as negative examples. The first value may be the confidence itself or a certain value proportional to the confidence.

The second calculation unit 163 calculates a second value obtained by weighting the first value such that the second value decreases as the confidence increases. In a method of the related art, the first value is usable as an error in training of the model. However, in this embodiment, the second value is used as the error. For example, the second calculation unit 163 performs processing to make the error decrease as the confidence increases for the candidates of the negative examples. This is because, as described above, when there are a plurality of candidates for the gripping position, only one candidate is treated to be true and the other candidates are treated to be false. In such a case, candidates at which the object is supposed to be successfully gripped are handled as the background. Such candidates tend to be assigned high confidences. Thus, when the first value that is proportional to the confidence is used as an error without any processing, it may become difficult to increase the recognition accuracy of the model.

The second calculation unit 163 calculates the second value for each of candidates having the first values ranked in a certain place or higher. In this case, the second calculation unit 163 calculates, instead of calculating the second value as the error for all the candidates of the negative examples, the second value for a certain number of candidates with high confidences from the top.

The updating unit 164 updates the model such that the second value decreases. The updating unit 164 updates the model such that both the second value and a third value decrease. The third value indicates the magnitude of a difference of a selected region from the region of a truth set in advance in the first image.

The updating unit 164 minimizes errors in the rectangle and in the confidence by using a technique similar to that of the SSD. The third value is an error of a bounding box and a confidence thereof output by the model from a gripping position of the truth set in advance for the learning data and a confidence thereof.

The gripping position of the truth and the confidence thereof may be a label assigned by the assigning unit 13. For example, in the case where gripping is successful in a certain region and the confidence for the region being the gripping position output by the model is equal to 0.9, the error in the confidence for the region is equal to 0.1. It is assumed that, when gripping is successful in a certain region, a confidence of 1 is assigned to the region by the assigning unit 13.

The learning data storage unit 17 stores the learning data. As described before, the learning data is constituted by a combination of an image and a label. For example, the learning data is constituted by a combination of an image and a region to which 1 is assigned as the confidence by the assigning unit 13 within the image.

The model parameter storage unit 18 stores parameters of the model. For example, the model parameter storage unit 18 stores parameters such as weights and bias used in a neural network. It is assumed that, by using the parameters stored in the model parameter storage unit 18, a trained model that has been trained by the learning apparatus 10 may be reproduced. The updating unit 164 is capable of updating the model by updating the parameters stored in the model parameter storage unit 18.

[Process by Learning Apparatus]

A process performed by the learning apparatus 10 will be described in detail. Since the learning apparatus 10 performs teachingless learning, the learning apparatus 10 automatically generates learning data using a model first. At that time, the learning data may not be efficiently generated because the detection accuracy of the gripping position of the model is low at the beginning. Therefore, the learning apparatus 10 performs pre-learning using image recognition to increase the accuracy of the model.

Figure 3:
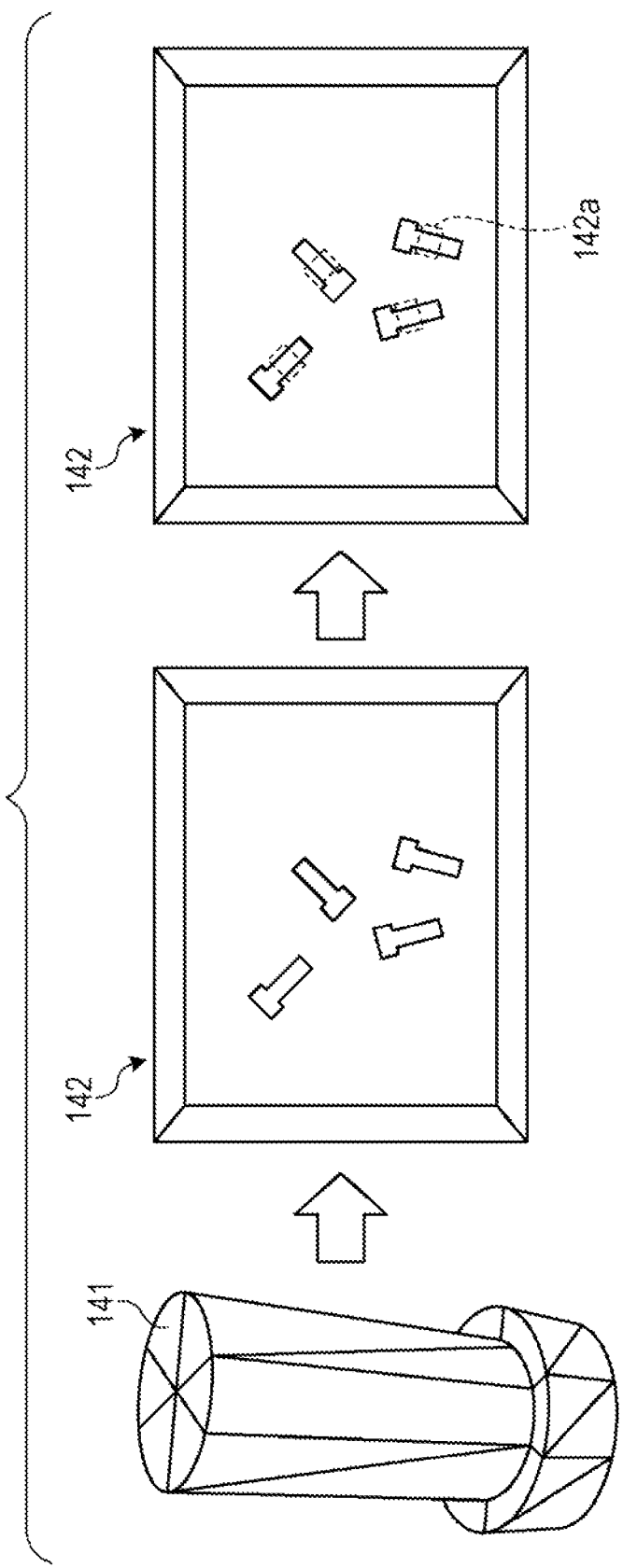
FIG. 3 is a diagram for describing pre-learning based on image recognition.

FIG. 3 is a diagram for describing pre-learning based on image recognition. As illustrated in FIG. 3, the recognition unit 14 first generates a 3D model 141 of an object to be gripped. It is assumed that the object to be gripped is a hexagon bolt. The recognition unit 14 then generates a computer graphics (CG) image 142 in which the 3D model 141 is arranged on a background imitating the tray 31. The recognition unit 14 then identifies a candidate 142a for the gripping position in the CG image 142 by performing image recognition.

The recognition unit 14 then generates learning data in which the CG image 142 is combined with a label representing coordinates, an angle, and the like of the identified gripping position. At that time, the recognition unit 14 assigns confidences to respective candidates including the candidate 142a for the gripping position. The recognition unit 14 then stores the generated learning data in the learning data storage unit 17. The learning unit 16 performs pre-learning by using the learning data stored in the recognition unit 14.

As Illustrated in FIG. 3, the gripping position is represented by an inclined rectangle. The robot 32 is able to grip an object 311 by superposing the two fingers on the respective shorter sides of the rectangle representing the gripping position.

The learning apparatus 10 generates the learning data by performing gripping trials. FIG. 4 is a diagram for describing a flow of a generation process. As illustrated in FIG. 4, the output unit 15 first inputs an image 33a acquired by the acquisition unit 11 to a model 18a. The model 18a is a model that is created based on parameters stored in the model parameter storage unit 18 during the pre-learning. The model 18a outputs candidates for the gripping position and confidences for the respective candidates based on the input image 33a.

It is assumed that the model 18a outputs the candidates 311a, 311b, 311c, 311d, 311e, 311f, 311g, and 311h for the gripping position. It is also assumed that the candidate 311a has the highest confidence in this case. In this case, the gripping control unit 12 causes the robot 32 to try to grip the object 311 at the gripping position Indicated by the candidate 311a. The assigning unit 13 then stores the image 33a, the candidate 311a, and a label indicating whether gripping is successful in the learning data storage unit 17 in combination with one another.

Figure 5:
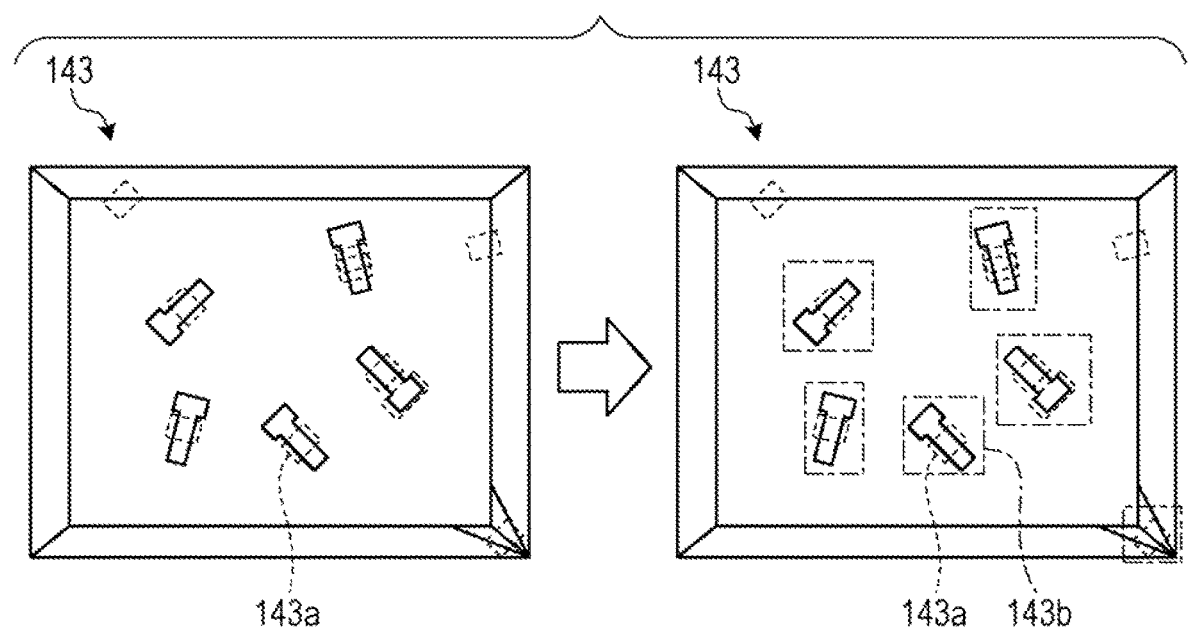
FIG. 5 is a diagram for describing selection of a gripping position based on image recognition.

When a gripping trial is performed, for example, when learning is not sufficiently advanced, there may be a case where the model outputs a high confidence for a candidate located at a position that is obviously wrong or dangerous. The recognition unit 14 is capable of identifying such a candidate by image recognition and excluding the candidate from candidates for which gripping trials are performed. FIG. 5 is a diagram for describing selection of the gripping position based on image recognition.

An image 143 in FIG. 5 is obtained by arranging candidates for the gripping position output by the model in an image acquired by the acquisition unit 11. The recognition unit 14 excludes a region that is obviously different from the gripping position from candidates in the image 143. Regions surrounded by dash-dot lines such as a region 143b in FIG. 5 are regions that are not excluded by the recognition unit 14. For example, the recognition unit 14 excludes a region that does not include any object to be gripped.

Figure 6:
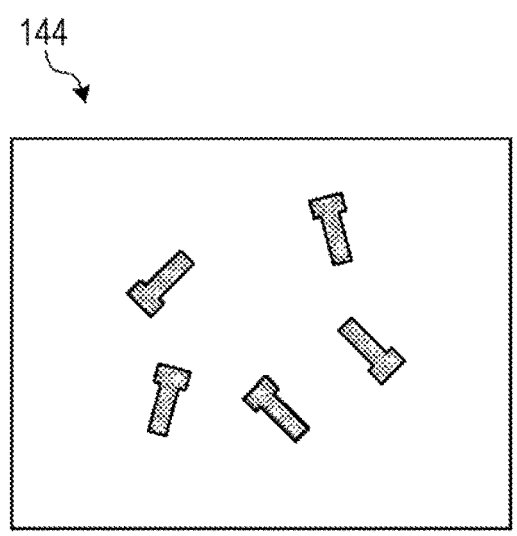
FIG. 6 is a diagram for describing weighting of a palette based on image recognition.

When the model does not output a candidate with a high confidence or when a gripping trial for a selected candidate fails, the recognition unit 14 outputs a candidate for the gripping position by image recognition in place of the model. For example, the recognition unit 14 extracts a region where an object possibly exists by determining a difference between an image of a state in which no object is placed on the tray 31 and an image acquired by the acquisition unit 11. The recognition unit 14 then weights a portion corresponding to the extracted region in the palette associated with the coordinates of the tray 31 in accordance with the presence probability of the object. For example, as illustrated in an image 144 in FIG. 6, the weighted portion is colored darker than the background. FIG. 6 is a diagram for describing weighting of the palette based on image recognition.

The learning apparatus 10 then performs a learning process by using the learning data generated through gripping trials. The learning data does not have to be generated through gripping trials and may be data having a predetermined format. For example, the learning data may be virtually generated using CG or image recognition technology without actually performing gripping trials.

Figure 7:
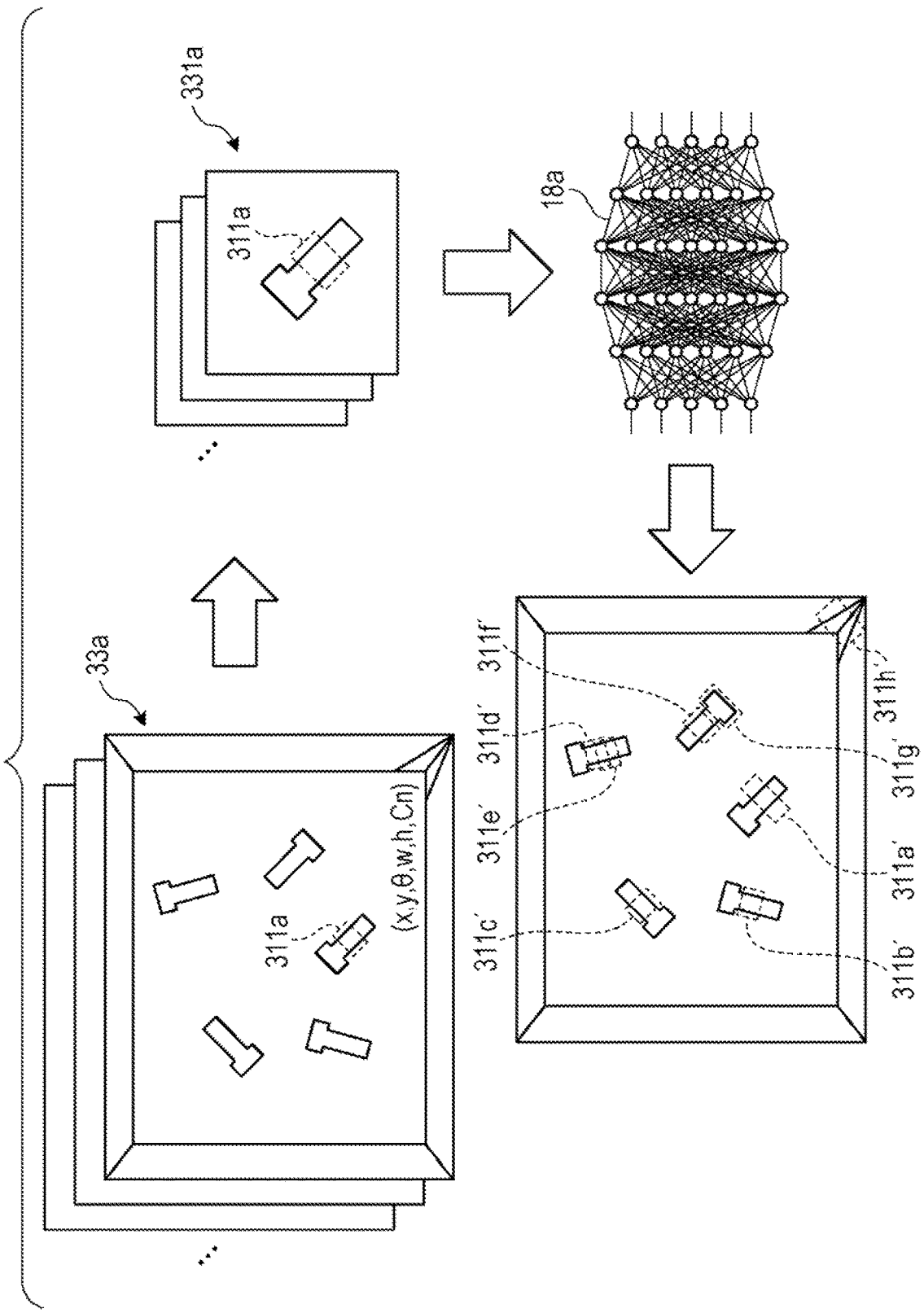
FIG. 7 is a diagram for describing a flow of a learning process.

FIG. 7 is a diagram for describing a flow of the learning process. As Illustrated in FIG. 7, the output unit 15 expands a plurality of pieces of learning data and inputs the expanded pieces of learning data to the model 18a. For example, one piece of learning data includes the image 33a and the candidate 311a for which the gripping trial has been successful.

The output unit 15 expands the learning data by dipping the image 33a at random positions to include the candidate 311a and have a certain size. For example, the output unit 15 expands the piece of learning data including the image 33a to pieces of learning data corresponding to a plurality of dipped Images including an image 331a.

The selection unit 161 selects a candidate 311a' of the positive example with the highest confidence from among the candidates output by the model 18a. The updating unit 164 then updates the model 18a such that an error between the candidate 311a of the learning data and the candidate 311a' of the positive example is minimized.

The model 18a further outputs negative example candidates 311b', 311c', 311d', 311e', 311f', 311g', and 311h' other than the candidate 311a'. The first calculation unit 162 and the second calculation unit 163 calculate errors of the negative example candidates.

The error is represented by Loss in Equation (1).

$$\text{Loss} = (L_{rec,true} + L_{conf,true}) + \alpha(L_{rec,false} + L_{conf,false}) \quad (1)$$

In Equation (1), Loss denotes a value obtained by adding the error of the positive example and the corrected error of the negative example. In addition, $L_{rec,true}$ denotes an error in the position and the rotation angle of the positive example, whereas $L_{conf,true}$ denotes an error in the confidence for the positive example. Further, $L_{rec,false}$ denotes an error in the position and the rotation angle of the negative example, whereas $L_{conf,false}$ denotes an error in the confidence for the negative example.

The first calculation unit 162 calculates $L_{rec,false} + L_{conf,false}$. The second calculation unit 163 calculates a coefficient $\alpha$ and multiplies $L_{rec,false} + L_{conf,false}$ by the coefficient $\alpha$. For example, the second calculation unit 163 obtains, as the coefficient $\alpha$, an output value that is obtained by inputting the confidence to a certain function whose output value monotonically decreases with respect to an input value.

Figures 8, 9:
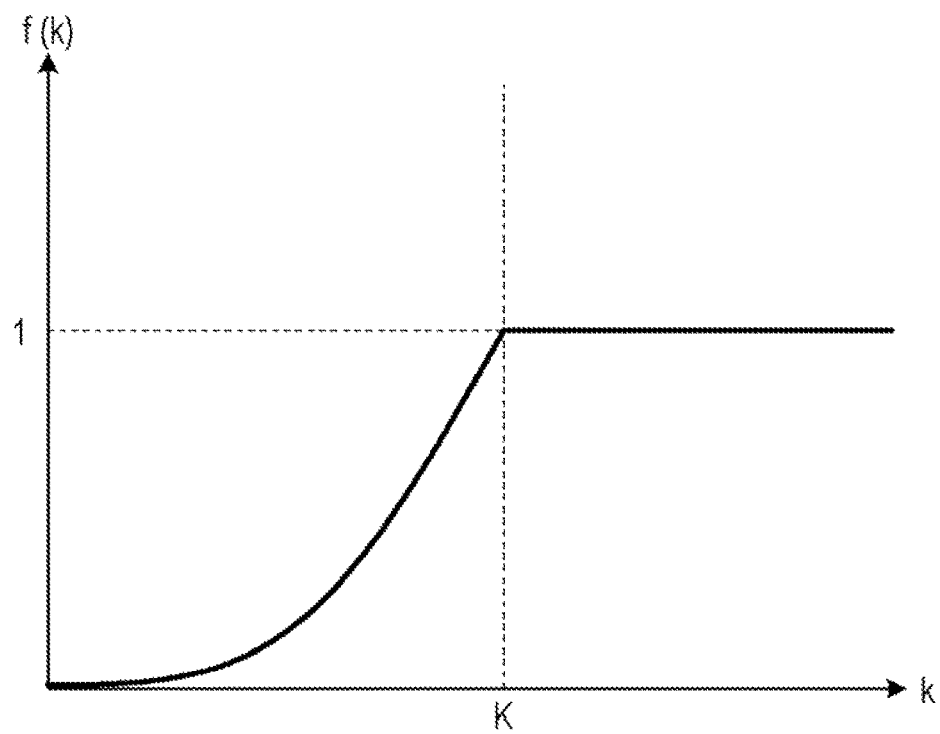
FIG. 8 is a diagram for describing a function.
FIG. 9 is a diagram for describing errors.

It is assumed that k denotes a place in the ranking of the magnitudes of the confidences for the respective negative example candidates. The function for outputting the coefficient $\alpha$ is represented as illustrated in FIG. 8. FIG. 8 is a diagram for describing the function. As Illustrated in FIG. 8, a function f(k) monotonically increases with respect to k. Since the confidence decreases as the place k increases, the function f(k) monotonically decreases with respect to the confidence derived from k.

A place K for specifying a range for which an error is suppressed to be small may be determined in advance. In this case, as illustrated in FIG. 8, the function f(k) outputs a value of 1 or less when the place k is within K (when k≤K) and outputs 1 when the place k is lower than K (k>K).

For example, K is set based on the number of objects placed on the tray 31 or the area or volume of the gripping range. The number of objects may be estimated by the recognition unit 14 by using a technique of the related art such as template matching, point cloud, or SSD.

For example, the second calculation unit 163 may calculate a by using Equation (2). In Equation (2), $\text{conf}_k$ denotes the confidence for the candidate ranked in the place k. It is assumed that $0 \leq \text{conf}_k \leq 1$ holds.

$$\alpha = \begin{cases} \frac{1}{2}(1.0 - \text{conf}_k)^2 & \text{if } k \leq K \\ \text{else } 1.0 \end{cases} \quad (2)$$

FIG. 9 illustrates an example of errors obtained by calculating the second values using Equation (2). FIG. 9 is a diagram for describing the errors. The selection unit 161 selects, as the positive example, the candidate 311a' that is a candidate with the highest confidence. Therefore, the candidate 311a' is classified into the gripping position class. In this case, the candidates 311b', 311c', 311d', 311e', 311f, 311g', and 311h' are negative example candidates and are classified into the background class.

The uncorrected error in FIG. 9 is an example of the first value. It is assumed that the uncorrected error of the negative example candidate is the confidence itself. The negative example rank denotes a place in the ranking of the magnitudes of the confidences for the negative example candidates. The corrected error is an example of the second value.

As illustrated in FIG. 7, it is considered that the candidates 311b', 311c', 311d', 311e', and 311f' are highly likely to be suitable as the gripping positions because their positions relative to the respective objects are similar to that of the candidate 311a'. On the other hand, the candidate 311h' is obviously unsuitable as the gripping position. It is considered that the candidate 311g' is slightly unsuitable as the gripping position when compared with the candidate 311a'.

The candidates 311b', 311c', 311d', 311e', and 311f' are regarded to be potentially true as the gripping position. Thus, the errors thereof as the negative examples are desirably small. Accordingly, the second calculation unit 163 calculates the corrected errors for the candidates 311b', 311c', 311d', 311e', and 311f' by using Equation (2) such that the uncorrected errors decrease. It is assumed that K=5 in this case. Therefore, since the coefficient $\alpha$ becomes equal to 1 when the negative example rank is the sixth place or lower, the corrected error calculated by the second calculation unit 163 is equal to the uncorrected error.

[Configuration of Detection Apparatus]

As illustrated in FIG. 1, the detection apparatus 20 is coupled to the gripping system 40. The gripping system 40 includes a tray 41, a robot 42, and a camera 43. Objects to be gripped are placed on the tray 41. The robot 42 is a picking robot having a two-finger hand. The robot 42 grips any of the objects placed on the tray 41. At that time, the robot 42 grips the object at a gripping position instructed by the gripping control apparatus 50. The camera 43 captures an image of the tray 41 from the above and transmits the captured image to the gripping control apparatus 50.

The gripping control apparatus 50 has substantially the same functions as the acquisition unit 11 and the gripping control unit 12 of the learning apparatus 10. For example, the gripping control apparatus 50 acquires an image of the objects placed on the tray 41 from the camera 43. The gripping control apparatus 50 transmits the acquired image to the detection apparatus 20 as the test data 20a. The gripping control apparatus 50 controls the robot 42 in accordance with the gripping position input thereto as the detection result 20b to cause the robot 42 to grip the object.

As Illustrated in FIG. 1, the detection apparatus 20 includes an output unit 21, a detection unit 22, and a model parameter storage unit 24. The model parameter storage unit 24 stores the same parameters as those stored in the model parameter storage unit 18 of the learning apparatus 10.

The output unit 21 has substantially the same functions as the output unit 15 of the learning apparatus 10. For example, the output unit 21 inputs the image of the test data 20a to a model to cause the model to output candidates for the gripping position and confidences for the respective candidates. The detection unit 22 detects a combination with the highest confidence from among the candidates output by the model. The image of the test data 20a is an example of a second image. The candidates for the gripping position which the output unit 21 causes the model to output are an example of second candidates. The gripping position detected by the detection unit 22 is transmitted to the gripping control apparatus 50 as the detection result 20b.

[Flows of Processes]

Figure 10:
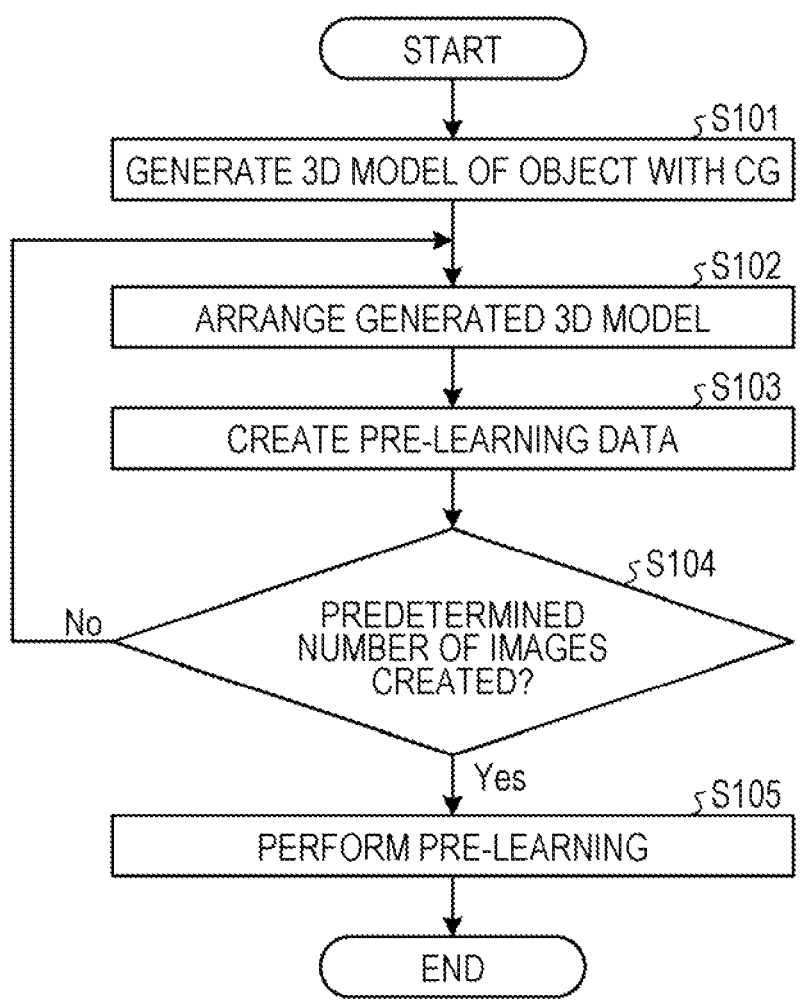
FIG. 10 is a flowchart Illustrating a flow of a pre-learning process.
Figure 11:
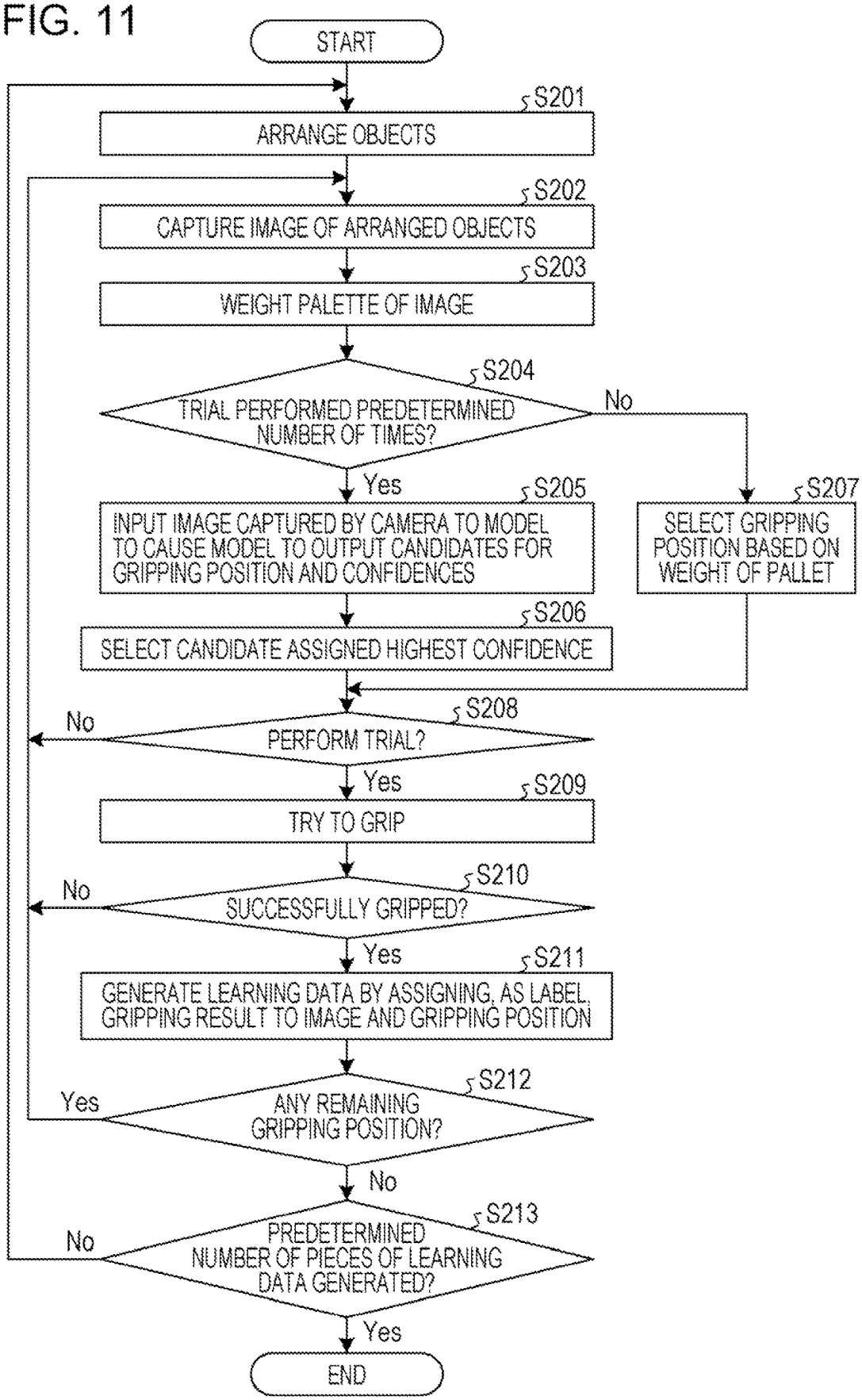
FIG. 11 is a flowchart Illustrating a flow of the generation process.
Figure 12:
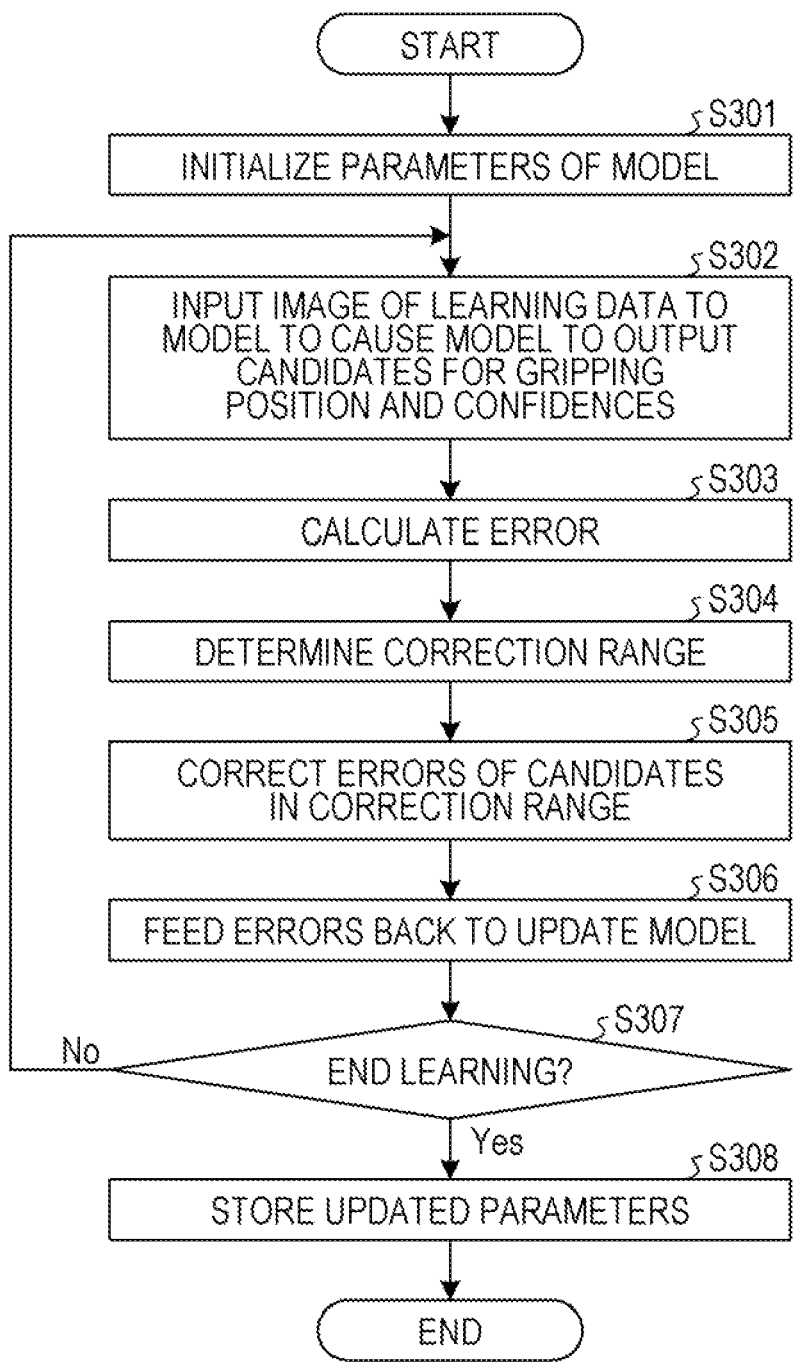
FIG. 12 is a flowchart Illustrating a flow of the learning process.
Figure 13:
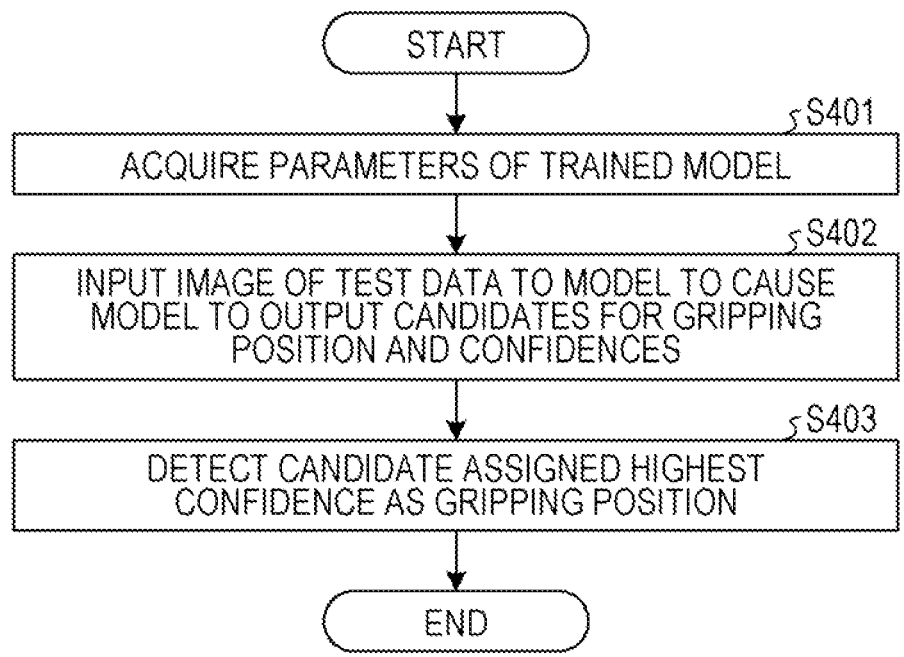
FIG. 13 is a flowchart illustrating a flow of a detection process.

Flows of processes according to the embodiment will be described with reference to flowcharts of FIGS. 10, 11, 12, and 13. FIG. 10 is a flowchart illustrating a flow of a pre-learning process. FIG. 11 is a flowchart illustrating a flow of the generation process. FIG. 12 is a flowchart illustrating a flow of the learning process. FIG. 13 is a flowchart illustrating a flow of a detection process.

The pre-learning process will be described with reference to the flowchart of FIG. 10. As illustrated in FIG. 10, the learning apparatus 10 generates a 3D model of an object with CG (step S101). The learning apparatus 10 then arranges the generated 3D model in an image (step S102).

The learning apparatus 10 then identifies a candidate for the gripping position by image recognition and generates pre-learning data (step S103).

The learning apparatus 10 determines whether a predetermined number of Images of pre-learning data have been created (step S104). If the predetermined number of images of pre-learning data have been created (Yes in step S104), the learning apparatus 10 performs pre-learning for the model by using the pre-learning data (step S105). On the other hand, if the predetermined number of images of pre-learning data have not been created (No in step S104), the process returns to step S102 and the learning apparatus 10 repeats the processing.

The generation process will be described with reference to the flowchart of FIG. 11. As Illustrated in FIG. 11, objects to be gripped are arranged on the tray 31 first (step S201). The camera 33 then captures an image of the objects that have been arranged (step S202). The learning apparatus 10 weights a palette of the image (step S203).

The learning apparatus 10 then determines whether the trial has been performed a predetermined number of times (step S204). If the learning apparatus 10 determines that the trial has been performed the predetermined number of times (Yes in step S204), the learning apparatus 10 inputs the image captured by the camera 33 to the model to cause the model to output candidates for the gripping position and confidences for the respective candidates (step S205). The learning apparatus 10 then selects the candidate with the highest confidence (step S206). On the other hand, if the learning apparatus 10 determines that the trial has not been performed the predetermined number of times (No in step S204), the learning apparatus 10 selects the gripping position based on the weight of the palette (step S207).

The processing from step S204 to step S207 is performed so that, when the number of times of the trial reaches a predetermined value without successful gripping, the learning apparatus 10 stops the model to output the candidates and outputs candidates by image recognition.

The learning apparatus 10 determines whether to perform the trial for the selected candidate (step S208). When a candidate output by the model and assigned a high confidence is obviously determined to be wrong or dangerous by image recognition, the learning apparatus 10 does not perform the trial for the candidate.

If the learning apparatus 10 determines that the trial is not to be performed (No in step S208), the process returns to step S202. The learning apparatus 10 then performs the generation process by using another image. On the other hand, if the learning apparatus 10 determines that the trial is to be performed (Yes in step S208), the learning apparatus 10 performs the trial (step S209).

The learning apparatus 10 determines whether gripping is successful in the trial (step S210). If the learning apparatus 10 determines that gripping is not successful (No in step S210), the process returns to step S202. The learning apparatus 10 then performs the generation process by using another image. On the other hand, if the learning apparatus 10 determines that gripping is successful (Yes in step S210), the learning apparatus 10 assigns the gripping result to the image and the gripping position as a label to generate learning data (step S211).

The learning apparatus 10 determines whether the gripping position is left for the tray 31 (step S212). For example, when it is identified that there is no object on the tray 31 by image recognition, the learning apparatus 10 determines that the gripping position is not left. If the learning apparatus 10 determines that the gripping position is left (Yes in step S212), the process returns to step S202. The learning apparatus 10 then performs the generation process by using another image.

On the other hand, if the learning apparatus 10 determines that the gripping position is not left (No in step S212), the learning apparatus 10 determines whether a predetermined number of pieces of learning data have been generated (step S213). If the learning apparatus 10 determines that the predetermined number of pieces of learning data have not been generated (No in step S213), the process returns to step S201. The learning apparatus 10 further performs the generation process after the object is rearranged. On the other hand, if the learning apparatus 10 determines that the predetermined number of pieces of learning data have been generated (Yes in step S213), the process ends.

The flow of the learning process will be described with reference to the flowchart of FIG. 12. As illustrated in FIG. 12, the learning apparatus 10 initializes parameters of the model that are stored in the model parameter storage unit 18 (step S301).

The learning apparatus 10 inputs an image of the learning data to the model to cause the model to output candidates for the gripping position and confidences for the respective candidates (step S302). The learning apparatus 10 then calculates an error (step S303). The error calculated in step S303 is the first value.

The learning apparatus 10 then determines a range of the negative example ranking for which the error is corrected (step S304). The learning apparatus 10 then corrects errors of the candidates within the correction range (step S305). The corrected errors obtained in step S305 are the second values.

The learning apparatus 10 feeds the corrected errors back to the model (step S306). At that time, for example, the learning apparatus 10 holds, as temporary data, the parameters of the model that have been updated based on feedback of the errors. The learning apparatus 10 then determines whether learning has been finished based on whether a certain condition is satisfied (step S307). For example, the certain condition may be that learning data yet to be input no longer exists, learning has been performed a predetermined number of times, amounts by which the parameters are updated have converged, or the like.

If the learning apparatus 10 determines that learning has been finished (Yes in step S307), the learning apparatus 10 updates the parameters in the model parameter storage unit 18 (step S308). The process then ends. At that time, the learning apparatus 10 may update the parameters by overwriting the model parameter storage unit 18 with the temporary data held therein.

If the learning apparatus 10 determines that leaning has not been finished (No in step S307), the process returns to step S302, in which the learning apparatus 10 repeats the processing. At that time, the learning apparatus 10 may perform the following processing after the temporary data held therein is reflected in the model.

The flow of the detection process will be described with reference to the flowchart of FIG. 13. As Illustrated in FIG. 13, the detection apparatus 20 acquires the parameters of the trained model from the learning apparatus 10, and stores the parameters in the model parameter storage unit 24 (step S401). The detection apparatus 20 may share the model parameter storage unit 18 with the learning apparatus 10. In such a case, step S401 is omitted.

The detection apparatus 20 inputs an image of the test data 20a to the model to cause the model to output candidates for the gripping position and confidences for the respective candidates (step S402). The detection apparatus 20 detects, as the gripping position, the candidate with the highest confidence (step S403).

[Advantages]

As described above, the learning apparatus 10 inputs a first image to a model, which outputs from input image candidates for a specific region and confidences indicating probabilities of the respective candidates being the specific region, to cause the model to output a plurality of candidates for the region and confidences for the respective candidates. The leaning apparatus 10 calculates a first value for each of the candidates whose confidences do not satisfy a certain criterion among the candidates output by the model. The first value increases as the confidence increases. The learning apparatus 10 calculates a second value obtained by weighting the first value such that the second value decreases as the confidence increases. The leaning apparatus 10 updates the model such that the second value decreases. In this manner, the learning apparatus 10 performs learning after reducing the error of the negative example candidate that is potentially true. This is particularly effective in a teachingless configuration in which it is difficult to assign a true label to all the candidates that are true. Therefore, the embodiment may increase the recognition accuracy of a model that is trained through teachingless learning.

The learning apparatus 10 calculates a second value for each of candidates with the first values ranked in a certain place or higher. Consequently, the learning apparatus 10 may make the error of a candidate that is potentially true smaller and keep the error of a candidate that is false as it is.

The learning apparatus 10 calculates the second value by multiplying the first value by an output value, which is obtained by inputting the confidence to a certain function whose output value monotonically decreases with respect to an Input value. Consequently, the learning apparatus 10 may correct an error in accordance with the magnitude of the confidence.

The learning apparatus 10 selects a candidate whose confidence satisfies a certain criterion as a selected region from among the candidates output by the model. The learning apparatus 10 updates the model such that both the second value and a third value decrease. The third value indicates the magnitude of a difference of the selected region from a region set to be true in advance in the first image. Consequently, the learning apparatus 10 may reflect both the positive example and the negative examples in the learning.

The learning apparatus 10 inputs a first image to a model, which outputs from input image candidates for a gripping position of an object and confidences indicating probabilities of the respective candidates being the gripping position, to cause the model to output a plurality of candidates for the gripping position and confidences for the respective candidates. Consequently, teachingless learning of a model that detects a gripping position for a picking robot may be performed.

The detection apparatus 20 inputs a second image to the model updated by the learning apparatus 10 to cause the model to output second candidates and confidences for the respective second candidates. The detection apparatus 20 detects, as a detected region, the candidate with the highest confidence among the second candidates. The detection apparatus 20 detects, as the gripping position, a candidate with the highest confidence among the second candidates. Consequently, the detection apparatus 20 may accurately detect the gripping position.

The detection apparatus 20 outputs the detected gripping position to the gripping control apparatus 50 that controls the robot 42 that grips an object. Consequently, the detection apparatus 20 may cause the gripping control apparatus 50 and the robot 42 to accurately grip the object.

In the embodiment described above, the description has been given on the assumption that the learning apparatus 10 calculates, by using Equation (2), the coefficient α used for calculating the second value. However, the learning apparatus 10 may calculate the second value by using Equation (3) without setting the place K in the ranking for specifying the target range in advance.

$$\alpha = (1.0 - \text{conf}_k)^2 \quad (3)$$

[System]

The processing procedures, the control procedures, the specific names, and the information including the various kinds of data and parameters cited in the specification and drawings described above may be changed in a given manner unless otherwise specified. The specific examples, distributions, numerical values, and so on described in the embodiment are merely examples and may be changed in a given manner.

The constituents of each of the apparatuses illustrated in the drawings are functionally conceptual and do not necessarily have to be physically configured as illustrated. For example, the specific configuration regarding the dispersion and integration of the apparatuses is not limited to the illustrated one. For example, all or some of the apparatuses may be configured to be distributed or integrated functionally or physically in given units depending on various loads, usage conditions, and so on. All or given some of processing functions performed by the apparatuses may be implemented by a central processing unit (CPU) and a program to be analyzed and executed by the CPU, or may be implemented as hardware by wired logic.

[Hardware]

Figure 14:
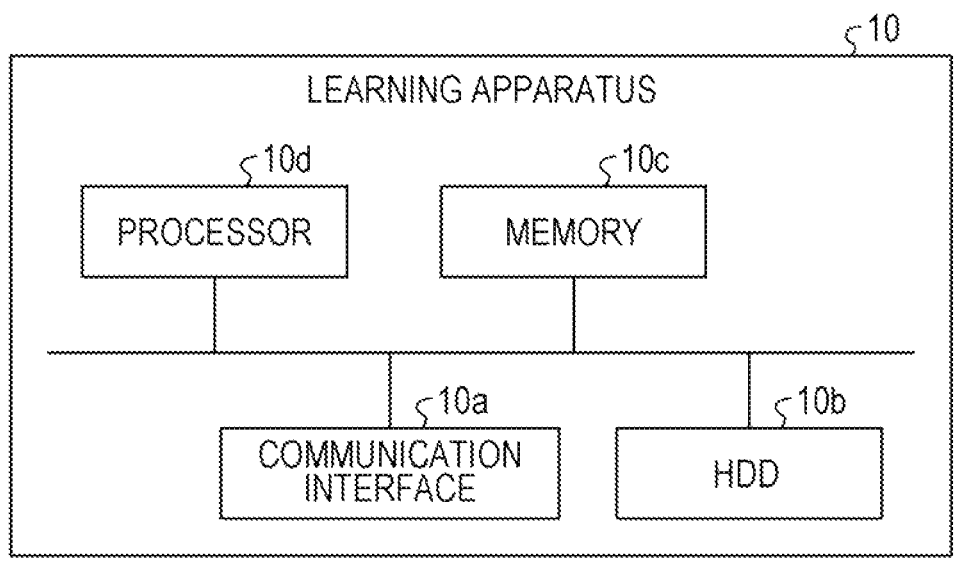
FIG. 14 is a diagram for describing an example of a hardware configuration.

FIG. 14 is a diagram for describing an example of a hardware configuration. As illustrated in FIG. 14, the learning apparatus 10 includes a communication Interface 10a, a hard disk drive (HDD) 10b, a memory 10c, and a processor 10d. The communication Interface 10a, the HDD 10b, the memory 10c, and the processor 10d illustrated in FIG. 14 are coupled to each other by a bus or the like. The detection apparatus 20 also has substantially the same hardware configuration as the learning apparatus 10. The detection apparatus 20 is also Implemented by substantially the same hardware configuration as the learning apparatus 10.

The communication interface 10a is a network interface card or the like and performs communication with other servers. The HDD 10b stores a program and databases (DB) for causing the functional units illustrated in FIG. 1 to operate.

The processor 10d is a hardware circuit that reads, from the HDD 10b or the like, a program for causing the substantially the same processes as those of the processing units illustrated in FIG. 1 to be performed and loads the program to the memory 10c to run a process of performing the functions described with reference to FIG. 1 and so on. For example, this process performs functions that are substantially the same as those of each of the processing units included in the learning apparatus 10. For example, the processor 10d reads a program having substantially the same functions as the acquisition unit 11, the gripping control unit 12, the assigning unit 13, the recognition unit 14, the output unit 15, and the learning unit 16 from the HDD 10b or the like. The processor 10d then executes a process for performing substantially the same processing as the acquisition unit 11, the gripping control unit 12, the assigning unit 13, the recognition unit 14, the output unit 15, the learning unit 16, and so on.

As described above, the learning apparatus 10 operates as an information processing apparatus that performs a learning method as a result of reading and executing the program. The learning apparatus 10 may implement functions that are substantially the same as those of the embodiment described above as a result of reading the program from a storage medium with a medium reading apparatus and executing the read program. The program described in other embodiments is not limited to a program that is executed by the learning apparatus 10. For example, the present disclosure may also be applied to cases where another computer or a server executes the program and where another computer and a server execute the program in cooperation with each other.

The program may be distributed via a network such as the Internet. The program may be recorded on a computer-readable storage medium such as a hard disk, a flexible disk (FD), a compact disc read-only memory (CD-ROM), a magneto-optical disk (MO), or a digital versatile disc (DVD) and may be executed after being read from the storage medium by a computer.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium having stored therein a learning program for causing a computer to execute a process, the process comprising:
    inputting a first image to a model to cause the model to output a plurality of first candidates for a specific region and confidences for the respective first candidates;
    calculating a first value for each of candidates whose confidence does not satisfy a certain criterion among the plurality of first candidates output by the model, the first value increasing as the confidence increases;
    calculating a second value obtained by weighting the first value such that the second value decreases as the confidence increases; and
    updating the model such that the second value decreases, wherein in the calculating of the second value, the second value is calculated by multiplying the first value by an output value obtained by inputting the confidence to a certain function whose output value monotonically decreases with respect to an input value.

2. The non-transitory computer-readable storage medium according to claim 1, wherein
    in the calculating of the second value, the second value is calculated for each of candidates ranked in a certain place or higher in ranking of magnitudes of the first values of the candidates whose confidences do not satisfy the certain criterion.

3. The non-transitory computer-readable storage medium according to claim 1, the process further comprising:
    selecting, as a selected region, a candidate whose confidence satisfies the certain criterion from among the plurality of first candidates output by the model, wherein
    in the updating, the model is updated such that both the second value and a third value decrease, the third value indicating a magnitude of a difference of the selected region from a region that is set to be true in advance in the first image.

4. The non-transitory computer-readable storage medium according to claim 1, wherein
in the inputting, the first image is input to the model to cause the model to output the plurality of first candidates for a gripping position of an object and the confidences for the respective first candidates.

5. The non-transitory computer-readable storage medium according to claim 1, the process further comprising:
inputting a second image to the model that has been updated in the updating of the model to cause the model to output second candidates and confidences for the respective second candidates; and
detecting, as a detected region, a candidate with a highest confidence among the second candidates.

6. The non-transitory computer-readable storage medium according to claim 5, wherein
in the inputting of the first image, the first image is input to the model to cause the model to output the plurality of first candidates for a gripping position of an object and confidences for the respective candidates,
in the inputting of the second image, the second image is input to the model to cause the model to output the second candidates for the gripping position and the confidences for the respective second candidates, and
in the detecting, the candidate with the highest confidence is detected as the gripping position among the second candidates.

7. The non-transitory computer-readable storage medium according to claim 6, the process further comprising:
outputting the gripping position detected in the detecting to a gripping apparatus that controls a robot for gripping the object.

8. The non-transitory computer-readable storage medium according to claim 1, wherein the model is a convolutional neural network implementing teachingless learning.

9. The non-transitory computer-readable storage medium to claim 1, wherein the candidates, whose confidences do not satisfy the certain criteria, are classified as negative example candidates, and
the updating the model based on the second values reduces error within the model by correcting error relating to the negative example candidates.

10. A learning method performed by a computer, the method comprising:
inputting a first image to a model to cause the model to output a plurality of first candidates for a specific region and confidences for the respective first candidates;

calculating a first value for each of candidates whose confidence does not satisfy a certain criterion among the plurality of first candidates output by the model, the first value increasing as the confidence increases;
calculating a second value obtained by weighting the first value such that the second value decreases as the confidence increases; and
updating the model such that the second value decreases,
wherein in the calculating of the second value, the second value is calculated by multiplying the first value by an output value obtained by inputting the confidence to a certain function whose output value monotonically decreases with respect to an input value.

11. The learning method according to claim 10, the method further comprising:
inputting a second image to the model that has been updated in the updating of the model to cause the model to output second candidates and confidences for the respective second candidates; and
detecting, as a detected region, a candidate with a highest confidence among the second candidates.

12. A learning apparatus comprising:
a memory, and
a processor coupled to the memory and configured to:
input a first image to a model to cause the model to output a plurality of first candidates for a specific region and confidences for the respective first candidates;
calculate a first value for each of candidates whose confidence does not satisfy a certain criterion among the plurality of first candidates output by the model, the first value increasing as the confidence increases;
calculate a second value obtained by weighting the first value such that the second value decreases as the confidence increases; and
update the model such that the second value decreases,
wherein the second value is calculated by multiplying the first value by an output value obtained by inputting the confidence to a certain function whose output value monotonically decreases with respect to an input value.

13. The learning apparatus according to claim 12, the processor further configured to:
input a second image to the model that has been updated in the update of the model to cause the model to output second candidates and confidences for the respective second candidates; and
detect, as a detected region, a candidate with a highest confidence among the second candidates.

* * * * *